(12) United States Patent
Grant

(10) Patent No.: US 6,759,809 B2
(45) Date of Patent: Jul. 6, 2004

(54) ILLUMINATED GRAPHICS SYSTEM

(76) Inventor: Gary M. Grant, 4211 212th Ave. NE., Sammamish, WA (US) 98074

( * ) Notice: Subject to any disclaimer, the term of this patent is extended or adjusted under 35 U.S.C. 154(b) by 0 days.

(21) Appl. No.: 10/199,216

(22) Filed: Jul. 19, 2002

(65) Prior Publication Data

US 2004/0012339 A1 Jan. 22, 2004

(51) Int. Cl.$^7$ ................................................. G09G 3/10
(52) U.S. Cl. .................... 315/169.3; 315/291; 313/498; 313/510; 439/924.1; 439/929
(58) Field of Search ............................ 315/169.3, 291, 315/209 R; 362/84, 95, 812; 313/498, 510, 519; 439/78, 924.1, 929

(56) References Cited

U.S. PATENT DOCUMENTS

| | | | |
|---|---|---|---|
| 4,730,146 A | * | 3/1988 | Maser et al. ................. 313/511 |
| 4,803,396 A | * | 2/1989 | Kelner .................. 313/318.01 |
| 5,045,755 A | * | 9/1991 | Appelberg .................. 313/498 |
| 5,621,991 A | * | 4/1997 | Gustafson .................... 40/544 |
| 5,780,965 A | * | 7/1998 | Cass et al. ................... 313/506 |
| 5,957,564 A | * | 9/1999 | Bruce et al. .................. 362/84 |
| 6,060,838 A | * | 5/2000 | Cantoni et al. ............. 315/159 |

* cited by examiner

Primary Examiner—Haissa Philogene
(74) Attorney, Agent, or Firm—Jensen & Puntigam, P.S.

(57) ABSTRACT

The graphics display system includes an electroluminescent lamp which has a connector member which includes electrical pin connections which are connected to the illuminating assembly of the lamp. The lamp also includes a graphic image portion which results in a lighted image when the lamp is illuminated. The lamp fits into a base assembly which includes a socket arrangement which receives the connector member of the lamp. The socket portion includes electrically conductive spring clips which mate with the electrical pin connections on the connecting member and firmly hold the lamp in place when the lamp is properly inserted into the socket. The electrically conductive spring clips are connected to a source of electrical signals for illumination of the lamp. The system also includes a green filter applied to a surface of the lamp, and a clear substrate applied to the upper surface of the filter. The graphic image is printed into the substrate.

9 Claims, 5 Drawing Sheets

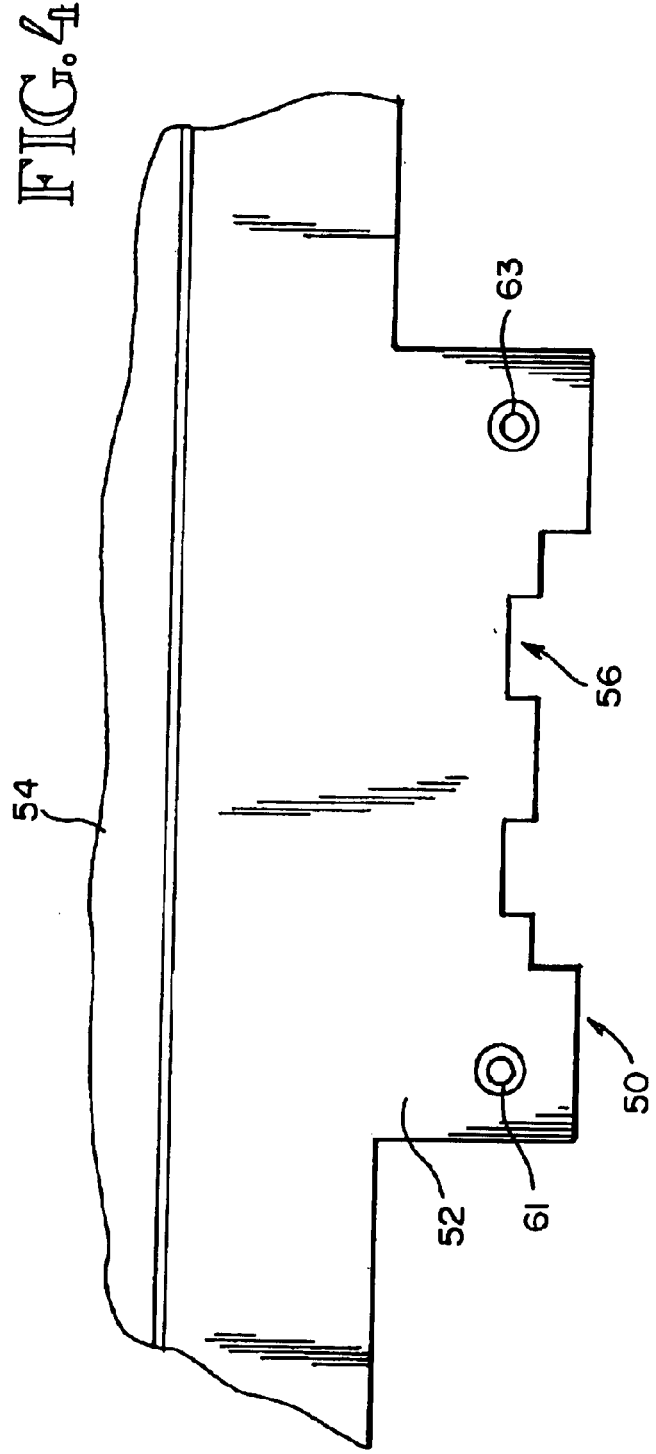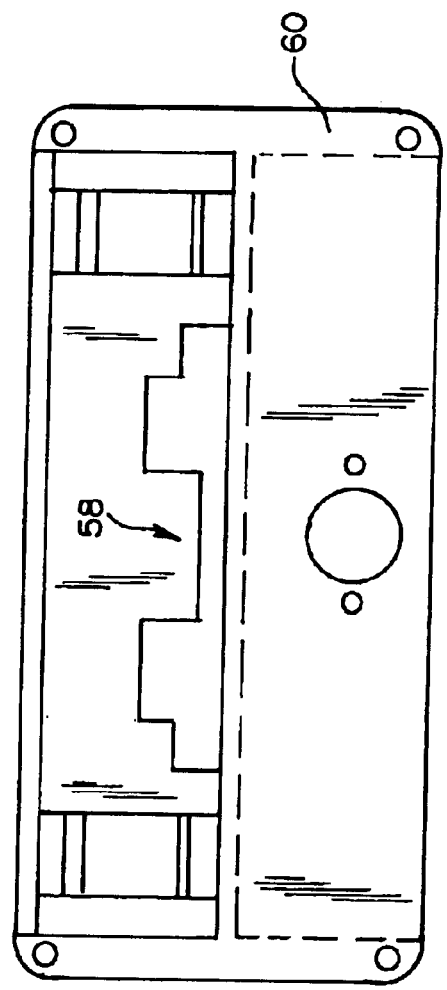

ILLUMINATED GRAPHICS SYSTEM

TECHNICAL FIELD

This invention relates generally to illuminated graphics systems, and more particularly concerns such systems using an electroluminescent lamp.

BACKGROUND OF THE INVENTION

Electroluminescent lamps are in general well known. Historically, however, such lamps were limited in their application because of small size, the requirement of expensive, unreliable and bulky power supplies, and a relatively short life. New developments, however, have resulted in high quality lamps which are produced in panel-like rolls 36 inches wide and up to 1200 feet long. The desired length of a lamp for a particular application may be conveniently cut from such a roll. The rolled lamp is quite thin, as is typical with electroluminescent lamps, on the order of 0.040 inches. The useful life of these newer lamps is now quite long, up to 9000 hours in maximum cases, although a more reasonable expectation is 6000 hours. The newer electroluminescent lamp is the subject of U.S. Pat. No. 5,045,755, among others.

Electroluminescent lamps have and are being used for illumination for various applications, including movie theater aisle lighting as well as in other retail environments, including arcades, amusement parks and restaurants. The lamps are also used for illumination of specific small, confined areas, such as the interiors of appliances, and the interiors of vehicles such as trucks, buses and trains.

Further, it is known that electroluminescent lamps can be used to make illuminated signage, in which printed graphics on optically clear overlaying material is applied to the lamp. In this arrangement, the original lamp is trimmed to the desired final size of the sign. The images are then applied to phosphor material by cold mounting. The combination of the image material and the phosphor is then placed onto the lamp and laminated to it, either by a cold or hot roll process. The laminated image on the lamp is then trimmed, leaving a frame of laminate around the graphic image. Current signage applications, however, have several disadvantages, including expense and cumbersome connections between the power supply and the lamp structure. Also, changing the lamp itself typically requires changing the entire graphics assembly.

In addition, the blue color of the electroluminescent lamps tends to result in somewhat unnatural illuminated colors when the conventional the graphic image/phosphor lamination process is used. Color matching to produce natural, accurate colors using electroluminescent lamps would be desirable.

SUMMARY OF THE INVENTION

Accordingly, one aspect of the present invention is an electroluminescent graphics display system, which comprises: an electroluminescent lamp which has an illuminating assembly and a connector portion which includes electrical contacts for connection to a source of electrical signals which illuminate the lamp, the lamp being adapted to receive a graphics portion so as to produce an illuminated image when the lamp is illuminated; and a base assembly, which includes a socket member which is adapted to receive and release the connector portion of the lamp, wherein the socket member has electrically conductive elements which are spaced such that they contact the electrical contacts on the connector portion when the lamp is correctly inserted into the base member, wherein the base member includes a source of electrical signals for illumination of the lamp, the electrical signals being transmitted through the electrically conducting elements in the base assembly to the electrical contacts on the connector portion for illumination of the lamp.

Another aspect of the invention is an electroluminescent lamp for a graphics display system, comprising: an electroluminescent lamp, the lamp having an illuminating assembly therein and a connector portion which includes electrical contacts for connection to a source of electrical power to illuminate the lamp, and a graphics portion thereon to produce an image when the lamp is illuminated, wherein the electroluminescent lamp, the graphics portion and the connector portion form a unitary integral unit for convenient insertion and removal from a base assembly, which includes connections to a source of electrical power.

A still further aspect of the invention is an electroluminescent lamp which is useful in a graphics display assembly, which comprises: an electroluminescent lamp member, which produces a salmon pink color; a: combination of a green filter member, a white layer member and a substrate layer, positioned outboard of an interior surface of the lamp, wherein the white layer is positioned outboard of the green filter; and a graphics image, outboard of the green filter member, the white layer and the substrate layer, wherein the images produced when the lamp is illuminated are characterized by natural colors and a realistic appearance.

BRIEF DESCRIPTION OF THE DRAWING

FIGS. 4 and 5 show a keying arrangement between the electroluminescent lamp member used in the system of the present invention and a lamp base assembly.

BEST MODE FOR CARRYING OUT THE INVENTION

Figure 1:
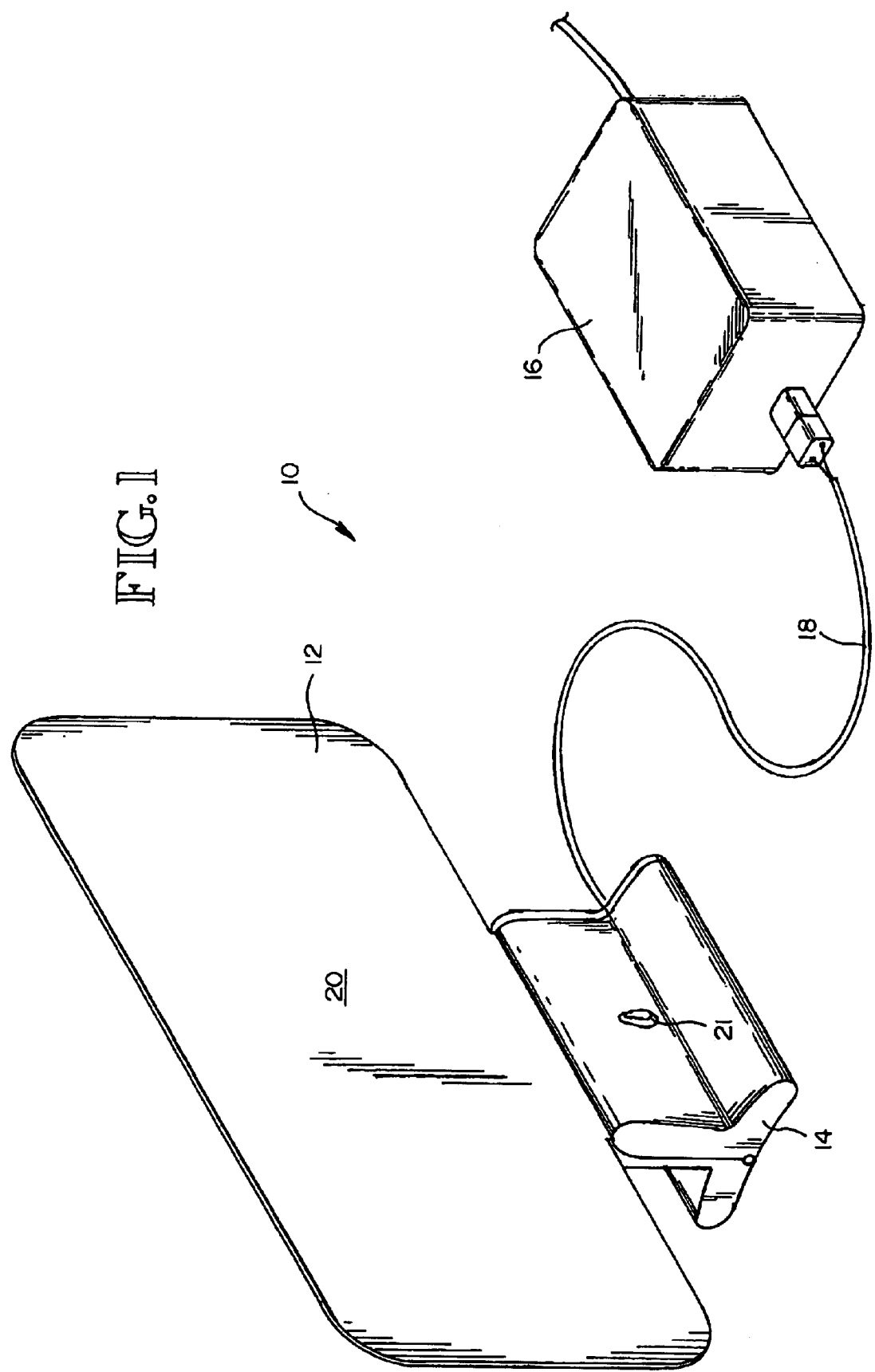
FIG. 1 is a schematic view showing one embodiment of the complete system of the present invention.

FIG. 1 shows the system of the present invention, generally at 10. The system includes an electroluminescent lamp or bulb 12 and a base assembly 14 in which the bulb is conveniently removably secured. A power supply 16 is connected to the base assembly by a connecting line 18, with the power supply connected to a 120 or 140-volt source, such as a wall outlet, by a power cord.

In one embodiment, the electronic circuitry which produces signals to drive the lamp are contained in a unit outside the base assembly, in conventional fashion. It could be a part of power supply 16. In another embodiment, the power supply 16 produces a 12-volt DC signal which is applied to an electronic circuit on a PC board 17 in the base assembly 14. In the embodiment shown, the electronic circuitry includes an inverter circuit which produces the 280-volt, 650 Hz drive signal for the lamp.

Figure 7:
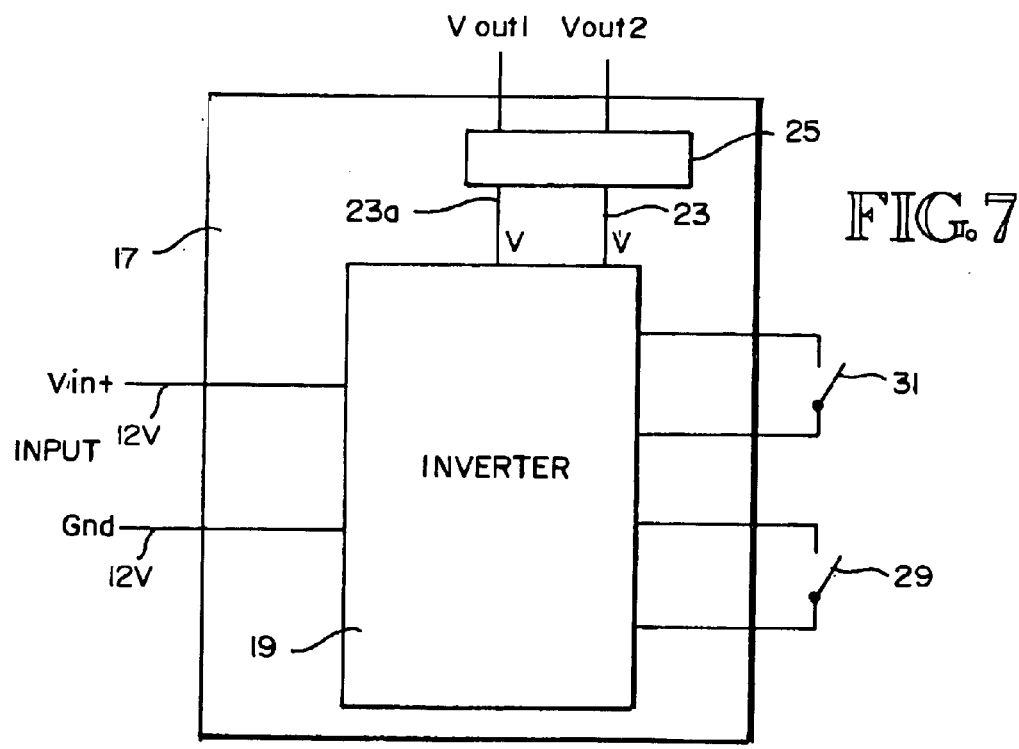
FIG. 7 is a simplified block diagram of a portion of the electrical system of the present invention.

FIG. 7 shows a simplified diagram of the inverter and related connections. The inverter circuit 19 is driven by a 12-volt DC signal at one amp, which can be supplied from an AC/DC converter which operates from an AC wall outlet, or supplied by a DC power source. The output lines 23 and 23a connect to other circuitry 25, such as noise reducers, etc. The output from the circuitry 25 is applied to clip connections discussed in more detail below for connection to the lamp.

An on-off switch 29 controls the on-off operation of the inverter 19. Another switch 31 causes the inverter to flash on/off (when the switch is open) or be constantly on, when the switch 29 is closed. The flashing rate of the inverter can be controlled, typically between once every two seconds to 1½ flashes per second. Also, the duty cycle of the inverter can be controlled separately; i.e. the inverter can be on/off a specific percentage of the time, e.g. 50%. Typically, the flash rate and the duty cycle of the inverter will be pre-set, such as by the factory, for a particular application. Use of flash and duty cycle will reduce the power requirements and increase the life of the lamp.

The base assembly also includes a dimmer knob portion 21 of a dimmer device located within the base assembly that provides a variable control for the brightness of the lamp. Secured to the surface 20 of the lamp 12 is a selected color-matched graphics assembly which is illuminated by lamp 12, explained in more detail below.

Figure 2:
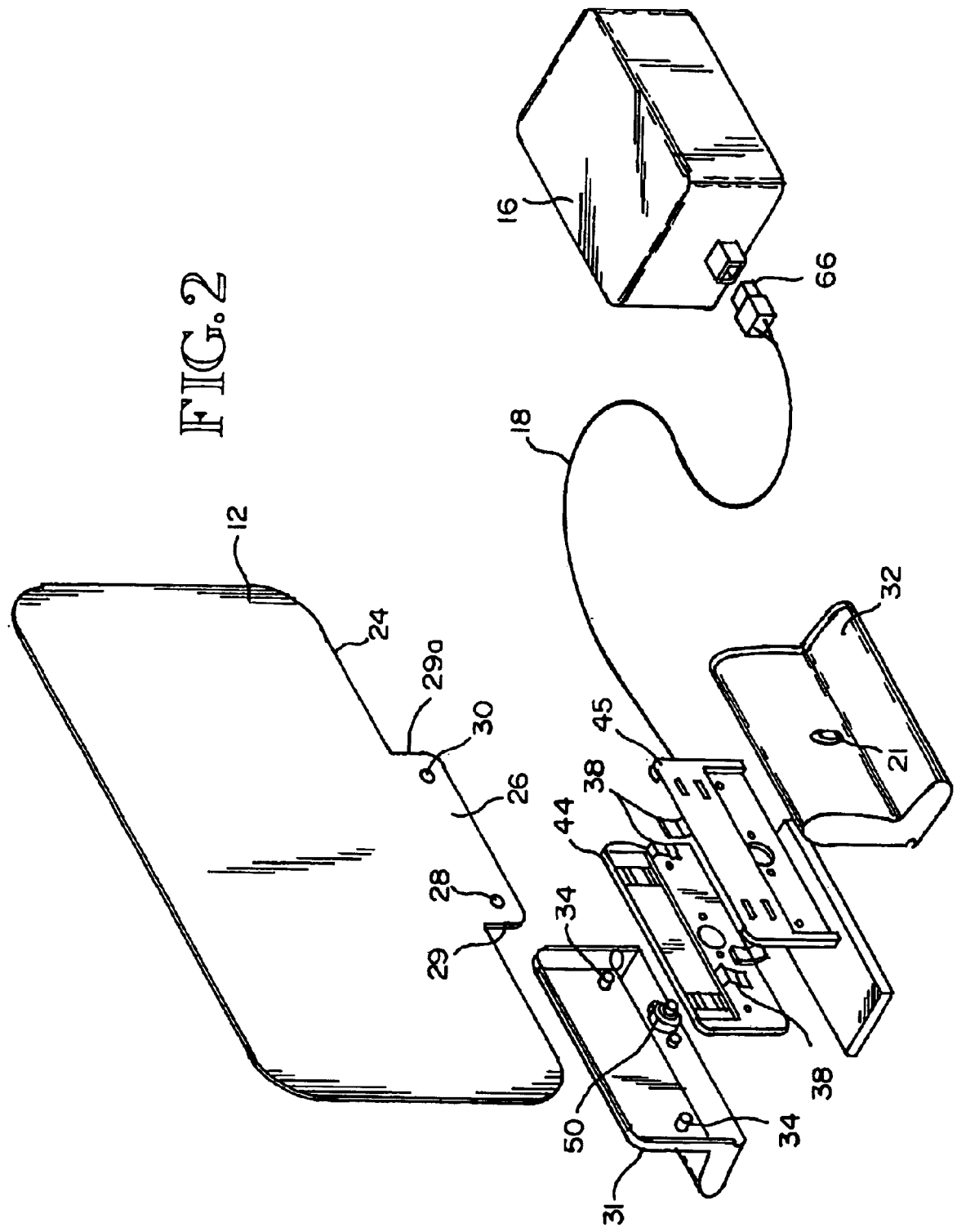
FIG. 2 is an exploded view of the system of FIG. 1.

FIG. 2 shows an exploded view of FIG. 1, showing the key features of the system of the present invention. As indicated above, the electroluminescent lamp 12 itself is conventional and can be purchased from various sources. The construction of the lamp and the general principle of electroluminescence is as set forth and explained in the '755 patent. Accordingly, a detailed explanation of the lamp is not provided herein. The lamp 12 does have electrical leads which connect to clip connectors on the base assembly, to which is applied the electrical drive signal for the lamp.

In more detail, along a portion of an outer edge 24 of lamp 12 is a lamp connector member 26. The connector member 26 is shown along the lower edge in FIG. 2; it could be along other edges of the lamp. Connector member 26 extends a short distance below lower edge 24 of the lamp. In one example, the connector member is approximately four inches long and 0.75 inches wide. The connector will have a similar thickness to the lamp itself, approximately 0.030 inches, which is quite thin and hence advantageous. The connector member 26 is of insulating material, typically polyester laminate, and is integral with the rest of the lamp.

Connector member 26 includes two electrically conductive pin elements 28 and 30, in the form of brass rivets in the embodiment shown, located near the opposing ends 29, 29a of the connector member. The connector member provides a strong, conveniently removable connection capability relative to base assembly 14. Base assembly 14 includes a housing which includes two housing half-sections 31, 32, which mate together by internal horizontal connector pins 34–34 on one half-section, with mating socket connections (not shown) on the other half-section. Each housing half-section has a vertical portion and a horizontal portion, forming an "L" configuration. The complete housing thus has a base portion extending in opposing directions from a central portion.

The central portion of the housing is hollow and has an opening 40 at the top thereof (FIG. 3), in which the connector member can be inserted. Mounted inside of the housing is a terminal block socket, which also comprises two half-sections 44, 45 of insulating material, such as plastic, with pin and socket connections, respectively, on the interior facing surfaces thereof. The terminal block is, in the embodiment shown, approximately 4.5 inches long by 1.25 inches high and 0.5 inches thick and fits in the interior of the housing. The terminal block half-sections 44, 45 are configured to fit together flush at the bottom thereof and the side edge, but with an internal space between them which extends from the top edge thereof down to the bottom flush-fitting portion. This internal space receives the connector member 26 of the lamp.

Figure 3:
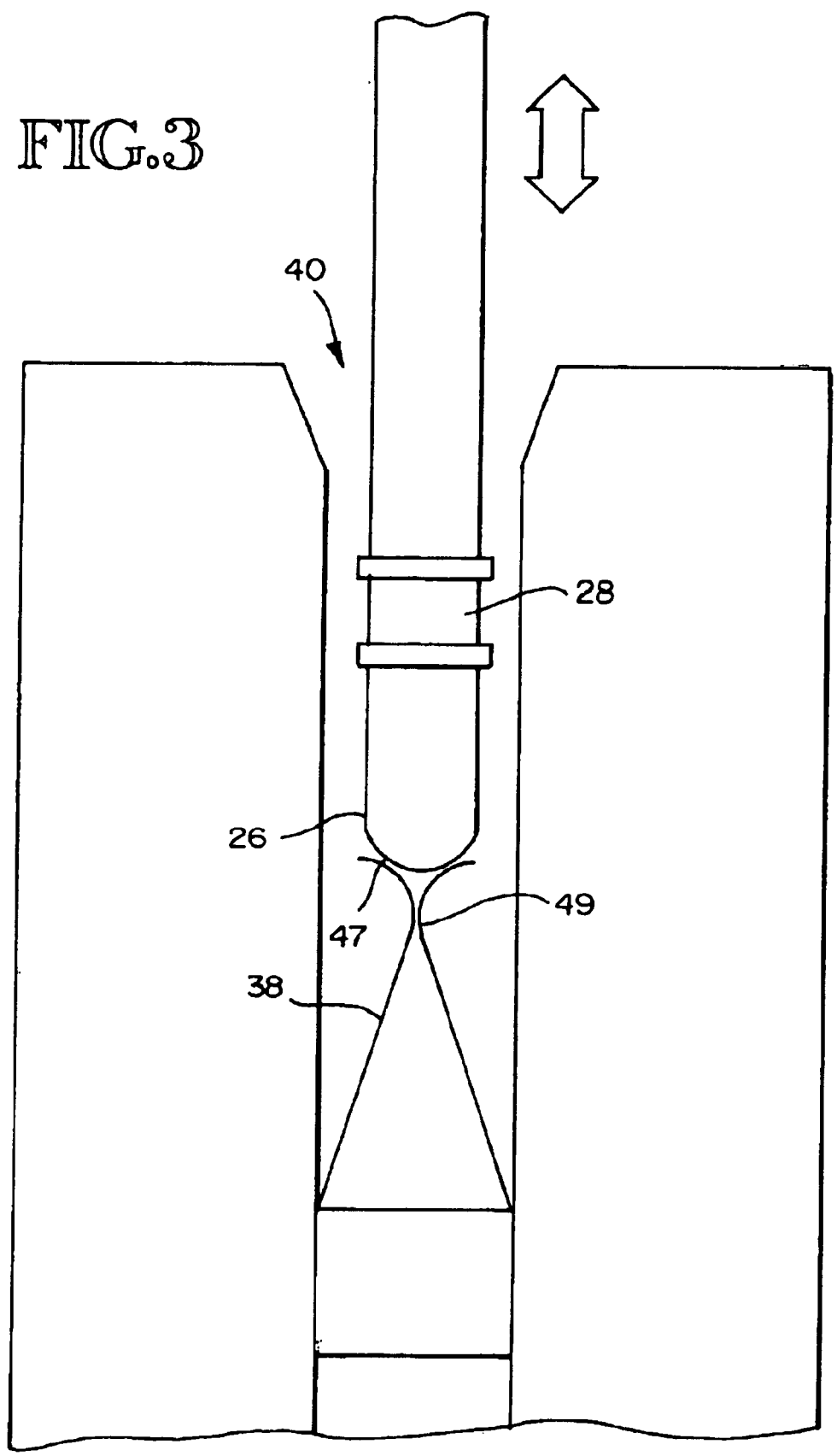
FIG. 3 is an end elevational end view of a portion of the system of FIG. 1.

In the embodiment shown, the width of the space within the terminal block is approximately 0.050 inches, while the thickness of connector member is approximately 0.065 inches, leaving a clearance of approximately 0.015 inches for ease of insertion, as illustrated in FIG. 3.

Near the bottom of the terminal block half-sections on the internal facing surfaces thereof are, respectively, two mating portions of two spaced electrically conducting brass clip connectors 38–38. The brass clip portions are configured to angle toward each other from the respective internal surfaces of the terminal block half-sections to the point where they almost contact each other. They then curve outwardly again away from each other. This is shown in FIGS. 2 and 3. The brass clip portions are resilient so that they can be moved apart readily but then spring back toward each other. The spring action of the clips tends to hold the lamp connector member in place between them.

The brass clips 38–38 are spaced and arranged so that when the lamp connector member is inserted between the brass clips and forced downwardly into the terminal block, the brass clip portions contact the pin elements 28 and 30 on opposing surfaces of the connector member portion of the bulb, thereby providing an electrical path between the brass clips 38–38 and the pin elements 28 and 30, which in turn connect to the drive elements in the lamp 12 for illumination thereof. The drive signal for the lamp 12 is applied to the brass clips.

FIG. 3 shows an end view of connector member 26 as the lower edge 47 thereof is positioned at the top of the brass clips 38–38. Pressing downwardly on the lamp 12 will result in the pin elements 28 and 30 coming into electrical contact with portions 49 of the brass clips 38–38. The lower end of the connector member 27 rests against the lower mating portions of the two terminal block sections. The spring action of the clips holds the connector member firmly in place in the terminal block, yet permits convenient insertion and removal of the lamp from the base assembly.

Figure 8:
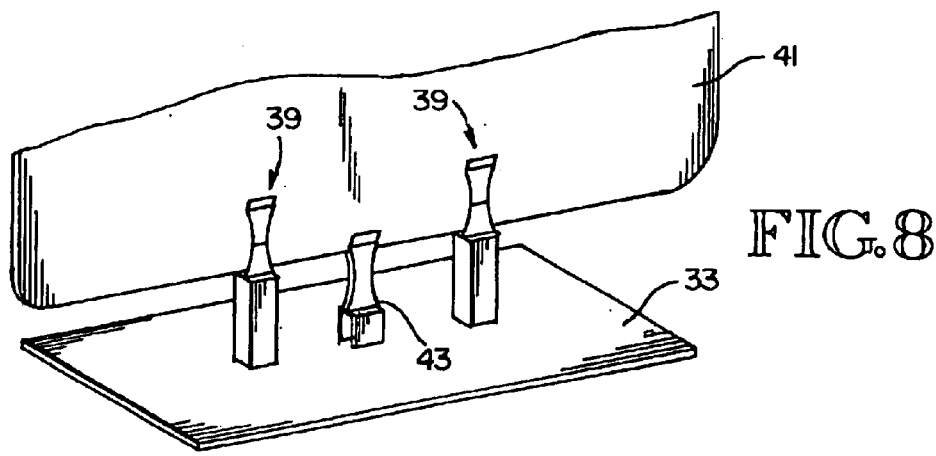
FIG. 8 is a schematic view of a portion of an electrical connection system used in the system of the present invention.

FIG. 8 shows another embodiment of the clip connector arrangement. In this embodiment, the PC board 33 containing the inverter is shown in a horizontal position, which is a typical position in the vertical base assembly shown. The clip connectors 39–39 are mounted on and extend from PC board 33. The output high voltage drive signal provided by the electronic circuitry on the PC board is applied to the connectors 39–39. The connector member portion 41 of the lamp fits into the clip connectors 39–39, such that the clip connectors make electrical connection with the pin elements (not shown) on the connector member.

Another clip connector 43 is mounted on the PC board and arranged such that when the connector member 41 is inserted into the clip connector 43, the clip connector portions thereof are separated, which results in the enabling (powering) of the inverter circuit. When the lamp connector member is not present, the clip connector portions contact each other, disabling the inverter.

The connector member of FIGS. 1 and 2 is shown with a straight lower edge 24. FIGS. 4 and 5 show a modification of the connector member, which is an additional feature of the present invention, directed to a particular physical configuration of the lamp connector member and an internal portion of the terminal block. In FIGS. 4 and 5, the lower edge 50 of the connector member 52 of lamp 54 is cut with a selected pattern 56. A mating pattern is provided in socket portion 58 of terminal block 60. If the pattern of the inserted connector member 52 does not exactly match the pattern on the socket portion 58 into which it is inserted, then the lamp cannot be inserted fully into the base assembly and there is no electrical connection between the brass clips in the terminal block and the pin terminals 61–63 on the connector member. The lamp is not illuminated.

This arrangement is advantageous, in that only lamps having a particular connector member edge configuration can be used with a given base assembly. This is important in certain commercial contexts, in which an advertiser, such as for beer for instance, may provide a retail tavern or restaurant owner a base assembly with the understanding that only the advertiser's illuminated signs can be used with the base assembly provided. The keying arrangement described above provides the supplier of the base unit better control over usage of its base assembly.

Referring again to FIG. 2, within the housing is a conventional dimmer unit 50 which can be used to control the brightness of the illumination for the sign. The dimmer includes a control knob 21, which is accessible to the user. The unit will also typically have an on-off switch. As discussed above, power supply 16 supplies 12-volt DC power to the inverter circuit in the lamp base. The power supply has a quick-disconnect. The lamp operating voltage supplied by the inverter can vary, depending upon the particular lamp, from 150 to 280 volts AC, while the frequency of the signal can vary from 400 to 650 Hz. The input to the power supply from the line is either 120 or 240 volts AC; the output can be 9, 12 or 24 volts DC, depending on the inverter.

While the base assembly 14 shown provides a vertical orientation for lamp 12, it should be understood that the base assembly could be reconfigured or shaped to integrate into various fixtures, frames or display systems or flattened horizontally for a horizontal positioning of the lamp.

The system of FIGS. 1 and 2 thus features an integral, unitary combination of an electroluminescent lamp with a connector portion which has electrically conductive elements for illumination of the lamp, which can be readily inserted and removed from an existing base assembly element. Hence, with the present invention, it is easy and convenient to simply exchange bulbs using very little, if any, skill and/or time.

Figure 6:
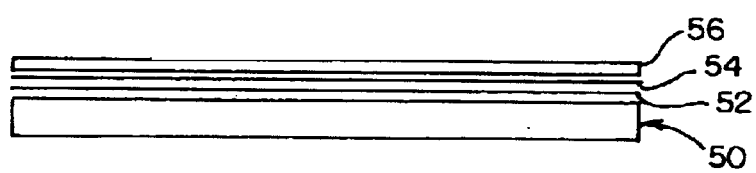
FIG. 6 shows a cross-sectional view of the lamp of the present invention with color matching.

Another important aspect of the electroluminescent system is the adjustment of the graphic image to produce realistic accurate color from the light produced by the electroluminescent lamp. The light produced by the lamp is in the blue wavelength range. FIG. 6 shows a cross-section of the lamp/graphics combination of the present invention which results in a true color image. The color from lamp unit 50 is typically a salmon pink (the emitted light is in the blue wavelength range, but the color of the light from the lamp unit is salmon pink). If a graphic image is screen printed or laminated on the lamp surface, the resulting colors when the lamp is illuminated are unnatural. This is a disadvantage in existing electroluminescent signs. In the present invention, to provide natural colors, a medium green filter 52 is screen printed (approximately 0.001 inches) on the surface of the lamp. A modified white U/V receiver layer 54 is then applied (approximately 0.001 inches thick) on top of the green filter. A substrate is then applied. One suitable substrate is OCPS (optically clear, pressure sensitive) acetate manufactured by Dupont. The OCPS mylar film produces a transparent or reduced refractive surface for the color ink graphics. The substrate could also be translucent. The white layer and the substrate could be one element. In an alternative arrangement, a clear substrate could be applied to the lamp, and the green filter, the white layer and the image are then printed successively on the substrate.

A conventional four-color CMYK process is used to print the graphic image 56 on the white receiver or substrate layer: C-cyan (a blue color), M-magenta, Y-yellow, K-black. The color process is carried out by a graphics software program, such as PhotoShop from Adobe. The red tones (magenta) are balanced throughout the entire range to ensure natural looking earth tones and flesh tones. Contrast within the graphic image is also addressed, with the goal being to approximate the contrast of the original graphic image. The printed graphic image is 0.002 to 0.010 inches thick.

One suitable CYMK medium is a printable ultraviolet ink system that provides optimum luminosity, color density and color control. The clarity of the ink base printing is quite important to an accurate image with corrected color. One example is the UV Opticlear System by Sericol.

The above system, using a green filter, a diffused white layer with a Mylar substrate and a corrected color graphic image, has the advantage of being transmissive whether the lamp itself is on or off. When the light is on, the image will have natural colors and when the light is off, the reflective sign is still attractive. Existing signage using electroluminescent lamps do not have these characteristics.

The graphic image has a desired resolution of not less than 75 lines per inch when the image is less that 24 inches by 24 inches; for larger lamps, the resolution should be greater than 55 lines per inch. Optical enhancers or brighteners can be used, as additions to the ink, which will improve the overall luminosity of the image.

Accordingly, a display system has been disclosed which includes an electroluminescent lamp assembly which has a construction such as to provide significant operational flexibility and convenience relative to exchange or replacement of lamps in an associated base assembly. In addition, a method has been described using the graphic material provided in the lamp arranged and printed so that natural-looking images are produced from the electroluminescent lamp, which produces color in the blue range. Further, a lamp-graphic image combination has been developed which provides natural, attractive images both when the electroluminescent lamp itself is illuminated or not.

Although a preferred embodiment of the invention has been described for purposes of illustration, it should be understood that various changes, modifications and substitutions may be incorporated in the embodiment without departing from the spirit of the invention which is defined in the claims which follow.

What is claimed:

1. An electroluminescent graphic display system, comprising:
   an electroluminescent lamp having an illuminating assembly therein and a connector portion which includes electrical contacts for connection to a source of electrical signals for illumination of the lamp, the lamp being adapted to receive a graphics portion so as to produce an illuminated image when the lamp is illuminated; and a base assembly, which includes a socket member adapted to receive and release the connector portion of the lamp, the socket member having electrically conductive elements which are spaced such that they contact the electrical contacts on the connector portion when the lamp is correctly inserted into the base assembly, wherein the base assembly includes a source of electrical signals for illumination of the lamp, the electrical signals being transmitted through the electrically conducting elements in the base assembly to the electrical contacts on the connector portion for illumination of the lamp.

2. A system of claim 1, wherein the electrical contacts on the connector portion of the lamp are two spaced pin elements within the connector portion, and wherein the electrically conducting elements on the base assembly are two spaced sets of spring-biased electrically conducting metal clips, wherein when the lamp is inserted into the base assembly, the spring clips are forced apart to receive the connector portion, wherein the pin elements on the connector portion come into electrical contact with the spring clips.

3. A system of claim 1, wherein the base assembly includes a slot at the top thereof configured to guide the insertion of the lamp into the base assembly and the connector portion between the respective pairs of spring clips.

4. A system of claim 1, wherein the graphics portion includes a green filter applied to the surface of the lamp, a white layer and substrate applied to an upper surface of the green filter layer and a graphic image member applied to the substrate, so that natural accurate colors are seen from the graphic display system.

5. A system of claim 4, wherein the substrate is a clear film.

6. A system of claim 4, wherein the green filter layer is approximately 0.001 inches thick and the substrate layer is approximately 0.001 inches thick.

7. A system of claim 1, wherein the connector portion has a lower edge which has a cutout, irregular pattern configured to mate with a matching portion of the socket in the base assembly, wherein the lamp is illuminated only when the connector portion mates with the base assembly matching portion.

8. An electroluminescent lamp for a graphic display system, comprising:

an electroluminescent lamp, the lamp having an illuminating assembly therein and a connector portion, which includes electrical contacts, for removable connection of the lamp to a source of electrical power to illuminate the lamp, and a graphics portion thereon to produce an image when the lamp is illuminated, wherein the electroluminescent lamp, the graphics portion and the connector portion form a unitary, integral unit for convenient insertion and removal of the unit from a base assembly, which includes connections to the source of electrical power.

9. The lamp of claim 8, wherein the connector portion has a lower edge which has a cutout, irregular pattern configured to mate with a matching portion of a receiving member of the base assembly, wherein the lamp is not illuminated unless the connector member portion mates with the base assembly matching portion.

* * * * *